(12) United States Patent
Itokawa

(10) Patent No.: US 6,959,115 B2
(45) Date of Patent: Oct. 25, 2005

(54) IMAGE PROCESSING APPARATUS AND METHOD, AND STORAGE MEDIUM THEREFOR

(75) Inventor: Osamu Itokawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 665 days.

(21) Appl. No.: 09/736,438

(22) Filed: Dec. 15, 2000

(65) Prior Publication Data

US 2001/0004404 A1    Jun. 21, 2001

(30) Foreign Application Priority Data

Dec. 21, 1999   (JP)   .................................. 11-362175

(51) Int. Cl.⁷ ............................................... G06K 9/00
(52) U.S. Cl. ..................................................... 382/239
(58) Field of Search ................................ 382/239–240; 375/240.02, 240.03; 348/384.1–440.1

(56) References Cited

U.S. PATENT DOCUMENTS

| | | | |
|---|---|---|---|
| 5,128,776 A * | 7/1992 | Scorse et al. ................ | 382/240 |
| 5,506,621 A | 4/1996 | Ogasawara et al. ......... | 348/396 |
| 5,604,539 A | 2/1997 | Ogasawara et al. ......... | 348/396 |
| 5,969,764 A * | 10/1999 | Sun et al. .............. | 375/240.06 |
| 6,028,539 A * | 2/2000 | Matsui ........................ | 341/55 |
| 6,188,796 B1 * | 2/2001 | Kadono ...................... | 382/243 |
| 6,415,057 B1 * | 7/2002 | Suzuki et al. ............... | 382/239 |

* cited by examiner

*Primary Examiner*—Andrew W. Johns
*Assistant Examiner*—Shervin Nakhjavan
(74) *Attorney, Agent, or Firm*—Fitzpatrick, Cella, Harper & Scinto

(57) ABSTRACT

Image data of plural objects are inputted, the inputted image data are encoded on an object basis, a priority order of code amount allocation is set for the objects, and encoding conditions for the objects in the encoding step are controlled in accordance with the priority order. The encoding conditions are controlled so that a total code amount obtained by encoding the image data of the plural objects does not exceed a predetermined code amount.

13 Claims, 20 Drawing Sheets

PRIOR ART  PRIOR ART
FIG. 9A   FIG. 9B
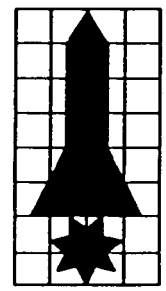
PRIOR ART  PRIOR ART
FIG. 10A   FIG. 10B
146  148
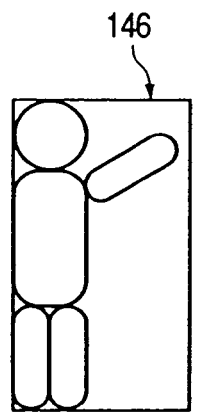
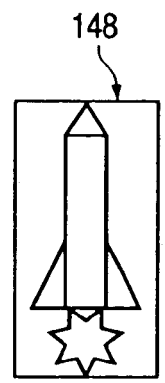
PRIOR ART  PRIOR ART
FIG. 11A   FIG. 11B
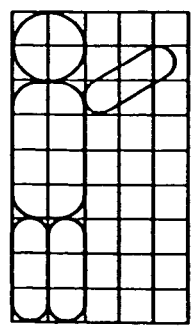
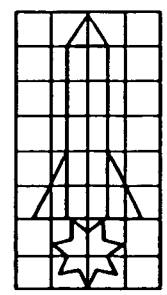

IMAGE PROCESSING APPARATUS AND METHOD, AND STORAGE MEDIUM THEREFOR

BACKGROUND OF THE INVENTION

1. Field of the Invention

The present invention relates to image processing apparatus and method, as well as a storage medium. More particularly, the invention relates to image processing apparatus and method for encoding plural objects of arbitrary shapes included in a moving image, as well as a storage medium used therein.

2. Related Background Art

Attention has recently been paid to a processing of separating and combining image data object by object. Particularly, as a moving image encoding method, an MPEG-4 encoding method is being standardized. According to the MPEG-4 encoding method, it is possible to effect encoding and decoding on an object basis. Hence, various applications so far difficult such as distribution of data in accordance with transmission lines and image re-processing and improvement of the encoding efficiency are expected.

Data of an object handled by the MPEG-4 method is constituted by not only such image data themselves as luminance (Y) data and color difference (chroma) data but also data representing the shape of object (shape data) and α data representing the transparency of object. However, the α data are omitted if there is no translucent state of object. Explanation of the α data will be omitted in the following description.

The basis of object encoding will be described below with reference to FIGS. 1 to 8.

Such an image as shown in FIG. 1 is here assumed. The image is composed of three objects which are a background, a person, and a rocket. As shown in FIGS. 2A to 2C, if the image shown in FIG. 1 is divided on the object basis, there are obtained three objects of a background (FIG. 2A), a person (FIG. 2B), and a rocket (FIG. 2C). These objects are encoded each independently, and then multiplexed.

FIG. 3 is a block diagram showing a schematic configuration of a conventional image encoding apparatus which performs encoding object by object.

In a conventional image encoding circuit are included, for each object, an encoding circuit and a generated code amount controlling circuit. In the example shown in FIG. 1, encoding circuits 110a to 110c, buffers 112a to 112c for temporarily storing output codes of the encoding circuits 110a to 110c, and code amount controlling circuits 114a to 114c which control output code amounts of the encoding circuits 110a to 110c in accordance with stored code amounts in the buffers 112a to 112c, are provided for the respective objects. Further, a multiplexing circuit 116 multiplexes outputs of the buffers 112a to 112c and outputs the thus-multiplexed data.

Next, a detailed description will be given below about the configuration of encoding circuits for a background image and objects of arbitrary shapes.

Reference will first be made to an encoding process for the background image. Image data of the background image is inputted to the image encoding circuit 110a. Encoding of the background image can be executed as a special type of the arbitrarily-shaped object encoding. This processing is the same as the conventional frame processing because the background image is a frame-size image. Therefore, it may be only image data that is to be inputted to the encoding circuit 110a, while shape data may be omitted.

First, a screen is divided into macrosize blocks and an encoding process is executed for each macroblock. FIG. 4 shows in what state the background image is divided into macroblocks. The macroblock comprises six blocks, as shown in FIG. 5.

FIG. 6 is a block diagram showing the configuration of an encoding circuit which executes an encoding process for each macroblock.

In the same figure, in a subtracter 120, inputted present image data (luminance-color difference data) are outputted as they are to a discrete cosine transform (DCT) circuit 122 in case of intra-frame encoding, while in case of inter-frame predictive encoding, a predictive value is substracted from inputted present image data and the result obtained is outputted to the DCT circuit 122.

The DCT circuit 122 performs a discrete cosine transform for the image data (or image difference data) from the subtracter 120 on a macroblock basis. A quantization circuit 124 quantizes a DCT coefficient outputted from the DCT circuit 122 and supplies the thus-quantized image data to both an inverse quantization circuit 126 and a variable length encoding circuit 140.

The inverse quantization circuit 126 inverse-quantizes the output of the quantization circuit 124, while the inverse DCT circuit 128 performs an inverse discrete cosine transform for the output of the inverse quantization circuit 126. An adder 130 sends output data of the inverse DCT circuit 128 as it is to a memory 132 if the output data is an image data of an intra-frame-encoded frame, while if the output data of the inverse DCT circuit 128 is an image difference data of an inter-frame-encoded frame, the adder 130 adds a predictive value thereto and then outputs the result obtained to the memory 132. The memory 132 stores image data of one or plural frames serving as predictive frames in inter-frame encoding.

A motion detection circuit 134 detects motion on the macroblock basis from inputted image data of series of frames. As motion detecting modes there are a mode (P frame) in which prediction is made from only the image preceding to the image to be encoded and a mode (B frame) in which prediction is made from both images respectively preceding to and suceeding to the image to be encoded. Usually, in the case of color difference (Cb, Cr) data, there is used a motion vector obtained from luminance (Y) data.

A motion compensation circuit 136 compensates the predictive frame image data from the memory 132 in terms of the motion vector provided from the motion detection circuit 134 and provides the thus-compensated data to both subtracter 120 and adder 130 as a predictive value in inter-frame predictive encoding. A motion vector prediction circuit 138 predicts the motion detected by the motion detection circuit 134 and sends a predictive value of the motion vector to the variable length encoding circuit 140.

The variable length encoding circuit 140 performs a variable length encoding for the output data of both quantization circuit 124 and motion vector prediction circuit 138 and outputs the thus-encoded data.

Referring back to FIG. 3, the buffers 112a to 112c temporarily store the encoded data of image and motion vector which are outputted from the encoding circuits 110a to 110c. The code amount controlling circuits 114a to 114c check duty or residual capacities of the buffers 112a to 112c and control the quantization step size of the quantization circuit 124 in the encoding circuits 110a to 110c so that the generated code amount may be within the target code amount.

Both image data and shape data are needed for the person (FIG. 2B) and the rocket (FIG. 2C). FIGS. 7A and 7B show shape data of the person and the rocket, respectively. Each shape data is defined by a rectangular area called a bounding box which includes the object concerned. Rectangles 142 and 144 shown in FIGS. 8A and 8B, respectively, are bounding boxes. Also when handling an image of an arbitrary shape, the encoding process is executed in the unit of a macroblock and therefore the bounding box is an integer multiple of the macroblock.

FIGS. 9A and 9B show how the interior of the bounding box is divided in macroblocks. Data in the bounding box is a binary data indicating the interior of the object concerned and the exterior thereof.

Image data, like the shape data, is also encoded in the bounding box size. Rectangles 146 and 148 shown in FIGS. 10A and 10B represent bounding boxes of image data of the person and the rocket, respectively. Since the image data is a multi-value data of 8 bits, a processing called padding is applied to the exterior of the object concerned. The padding is a processing for preventing a lowering of the encoding efficiency caused by a discontinuous object boundary.

FIGS. 11A and 11B show an example of dividing image data of the person and the rocket respectively into macroblocks.

FIG. 12 is a block diagram showing a schematic configuration of the encoding circuits 110a to 110c. Processing for image data is the same as in FIG. 6 and components of the same functions as in FIG. 6 are identified by the same reference numerals as in FIG. 6.

Intra-frame encoding is called I-VOP (Intra-Video Object Plane), a forward prediction processing in inter-frame encoding is called P-VOP, and a bidirectional prediction processing in intra-frame encoding is called B-VOP.

A shape encoding circuit 150 performs a predictive encoding for shape data. An output code of the shape encoding circuit 150 is fed to both a memory 152 and a variable length encoding circuit 158. The memory 152, which functions as delay means, provides stored data to a motion compensation circuit 156.

A motion detection circuit 154 detects a motion from both image data and shape data and sends the result of the detection to the motion compensation circuit 136, motion vector prediction circuit 138 and motion compensation circuit 156. In accordance with a motion vector provided from the motion detection circuit 154 the motion compensation circuit 156 performs a motion compensation for the data provided from the memory 152 and sends the thus-compensated data to the shape encoding circuit 150, which in turn performs a predictive encoding for the inputted shape data in accordance with a motion compensation predictive value provided from the motion compensation circuit 156.

The variable length encoding circuit 158 performs a variable length encoding for the encoded image data provided from the quantization circuit 124, motion vector information from the motion vector prediction circuit 138, and encoded shape data from the shape encoding circuit 150.

Turning back to FIG. 3, the data encoded in the encoding circuits 110a to 110c are temporarily stored in the buffers 112a to 112c, respectively. Since the generated code amount varies with the lapse of time, it is necessary to establish a certain period and keep the code amount constant within the period. The code amount control circuits 114a to 114c check residual capacities (or stored data volumes) of the buffers 112a to 112c, respectively, and then control the quantization step size of the quantization circuit 124 so that the values obtained become predetermined values. In this way the generated code amount is controlled so as to be converged to a target code amount.

The multiplexing circuit 116 multiplexes data provided from the buffers 112a to 112c and outputs them together as a single stream. Although only video data is illustrated in FIG. 3, the multiplexing operation also covers audio data and scene description data of a combined image.

In the prior art it is necessary to pre-set a target code amount for each object and it is impossible or difficult to set an optimum code amount for each object relative to a target code amount in the entire system. For example, if a target code amount of the person is set low and if target code amounts of the rocket and the background are high, only the image of the person will blur. If a lot of codes are allocated to the person and the rocket, the image quality of the background will be deteriorated. These points must be taken into account so as to give a well-balanced state in setting a target code amount of each object, but this has so far been very difficult.

Besides, the size of each object changes with the lapse of time, but according to the prior art it has been next to impossible to properly follow up such changes with time and control the entire code amount.

SUMMARY OF THE INVENTION

With the foregoing as background it is an object of the present invention to provide image processing apparatus and method capable of easily setting an optimum code amount for each object relative to a target code amount of an entire system, as well as a storage medium used therein.

For achieving the above-mentioned object, according to image processing apparatus and method in one preferred aspect of the invention, image data of plural objects are inputted, the inputted image data are encoded on an object basis, a priority order for the allocation of code amount is set for each of the objects, and encoding conditions for each object in the encoding step are controlled in accordance with the priority order so that the total code amount in encoding the image data of the plural objects does not exceed a predetermined code amount.

The recording medium in another preferred aspect of the invention stores a code of an input step of inputting image data of plural objects, a code of an encoding step of encoding the inputted image data on an object basis, and a code of a controlling step of setting for each of the objects a priority order for the allocation of code amount and controlling encoding conditions for each object in the encoding step in accordance with the priority order, wherein the controlling step controls the encoding conditions in the encoding step so that the total code amount in encoding the image data of the plural objects does not exceed a predetermined code amount.

Other objects, features and advantages of the invention will become apparent from the following detailed description taken in conjunction with the accompanying drawings.

BRIEF DESCRIPTION OF THE DRAWINGS

FIGS. 9A and 9B are schematic diagrams showing a divided state of the shape data into macroblocks within the bounding boxes;

FIGS. 10A and 10B are schematic diagrams of bounding boxes of person and rocket image data;

FIGS. 11A and 11B are schematic diagrams showing a divided state of the image data into macroblocks within the bounding boxes;

DETAILED DESCRIPTION OF THE PREFERRED EMBODIMENTS

Embodiments of the present invention will be described in detail hereinunder with reference to the accompanying drawings.

Figure 13:
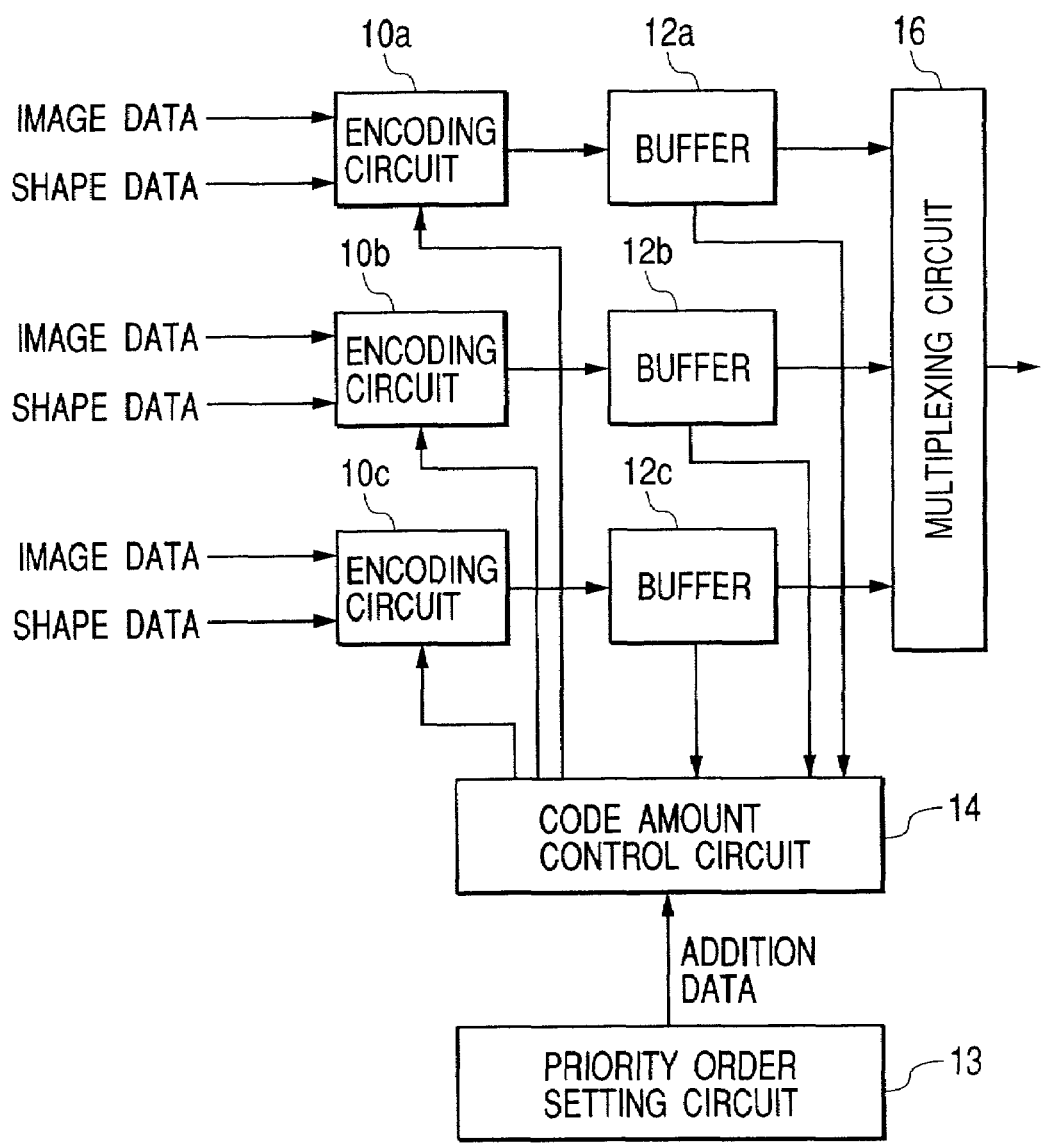
FIG. 13 is a block diagram showing a configuration of an image encoding apparatus according to a first embodiment of the present invention.

FIG. 13 is a block diagram showing a configuration of an image encoding apparatus according to an embodiment of the present invention.

In the same figure, the reference numerals 10a, 10b, and 10c denote encoding circuits for encoding image data and shape data on the object basis, the numerals 12a, 12b, and 12c denote buffers for temporarily storing output data of the encoding circuits 10a, 10b, and 10c, respectively, numeral 13 denotes a priority order setting circuit for setting a priority order among objects, numeral 14 denotes a code amount control circuit which controls a compression ratio (more specifically, a quantization step size) by the encoding circuits 10a, 10b, and 10c in accordance with additional data and residual capacities or stored data volumes of the buffers 12a, 12b, and 12c so that the total generated code amount becomes an optimum value, and numeral 16 denotes a multiplexing circuit for multiplexing the outputs of the buffers 12a, 12b, and 12c. The additional data represents, for example, a predetermined priority order among objects as a code amount control parameter.

Figure 14:
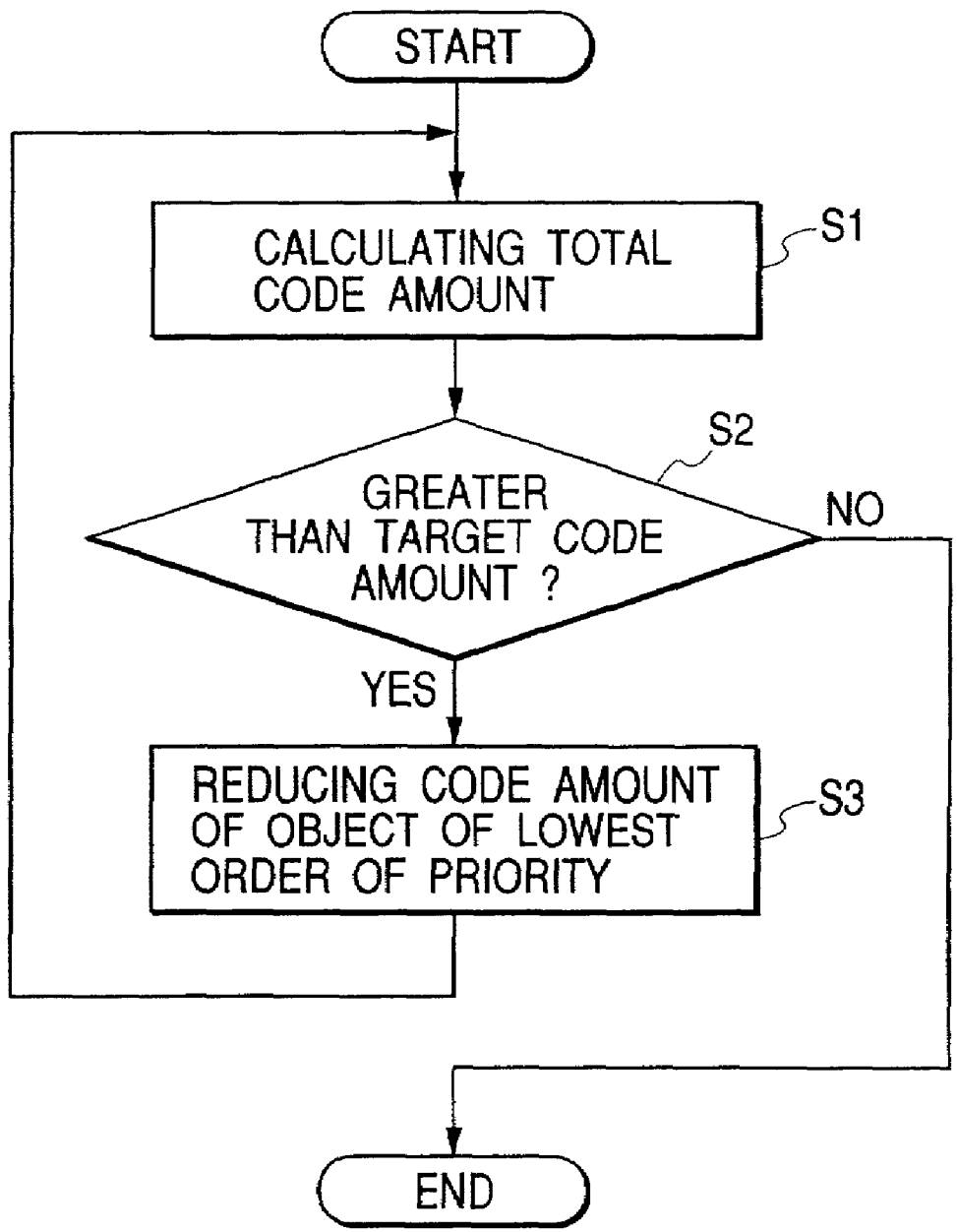
FIG. 14 is a flow chart showing a first example of processing operations of a code amount control circuit 14.
Figure 15:
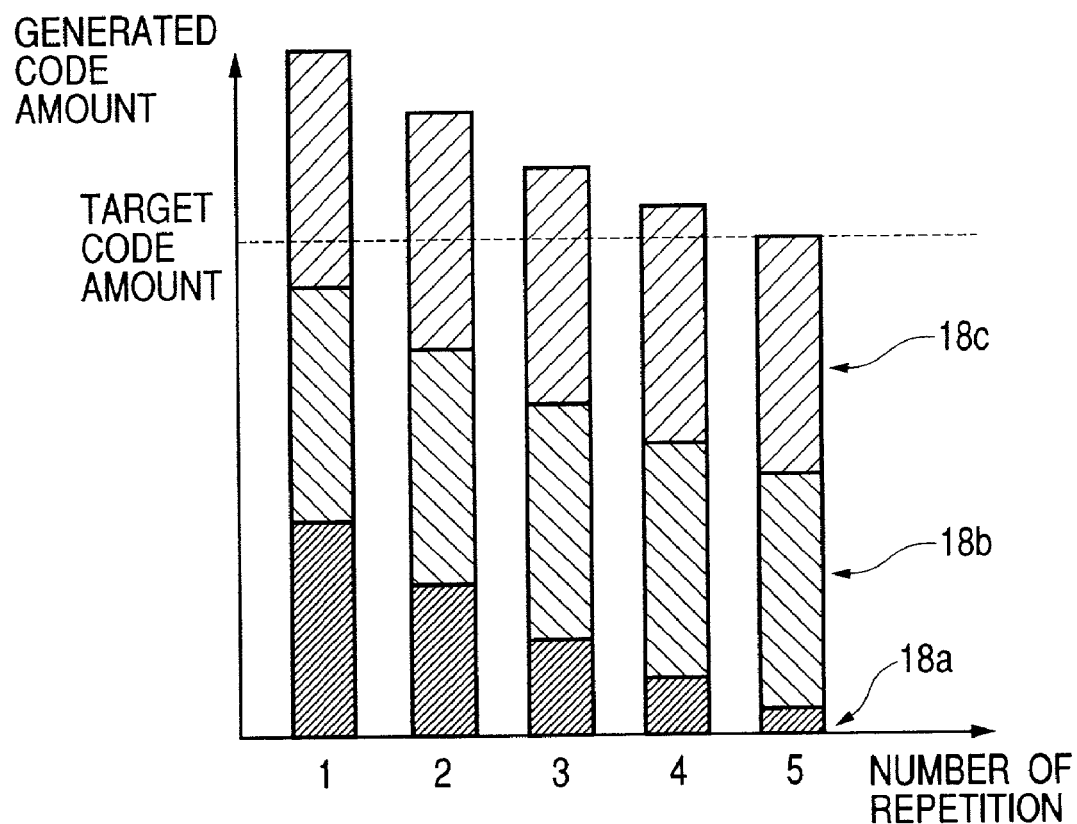
FIG. 15 is a schematic diagram showing in what manner a code amount control is made in accordance with the flow chart of FIG. 14.

FIG. 14 is a flow chart showing a first example of operations of the code amount control circuit 14 and FIG. 15 is a schematic diagram showing in what manner generated code amounts are converged to a target code amount by the code amount control processing shown in FIG. 14.

The operation of the code amount control circuit 14 will be described below with reference to FIGS. 14 and 15.

The code amount control circuit 14 calculates a total code amount by integrating stored data amounts in the buffers 12a, 12b, and 12c (S1), and determines whether the total code amount is greater than a target code amount or not (S2). If the total code amount is greater than the target code amount (S2), the control circuit 14 controls the encoding circuit 10a, 10b, or 10c so as to reduce the code amount of the object of the lowest priority (S3). Then, the total code amount is calculated again (S1), and reduction of the code amount of the object of the lowest priority (S3) and re-calculation (S1) are repeated until the total code amount is less than the target code amount (S2).

Figure 1:
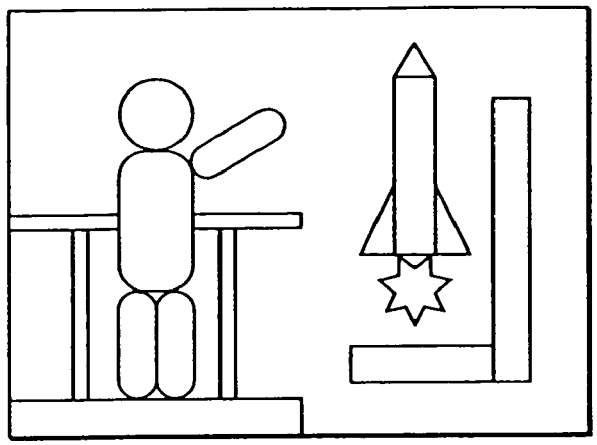
FIG. 1 shows an example of an image for explaining object encoding.
Figure 2A:
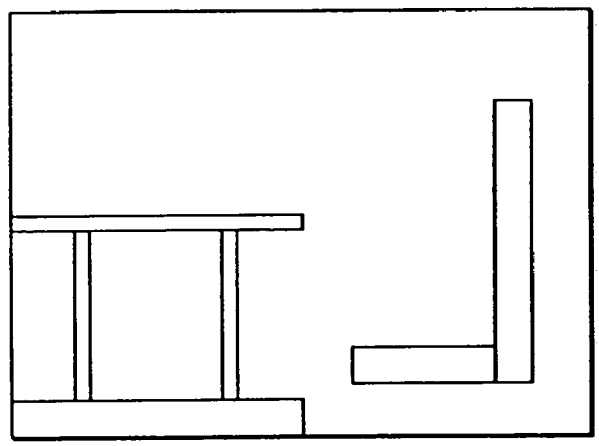
FIGS. 2A, 2B and 2C show an example of dividing the image of FIG. 1 into objects.
Figure 2B:
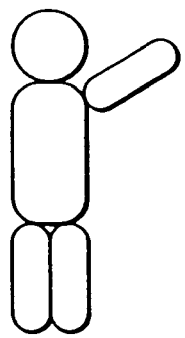
Figure 2C:
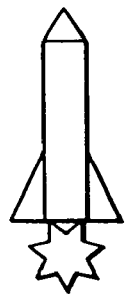
Figure 3:
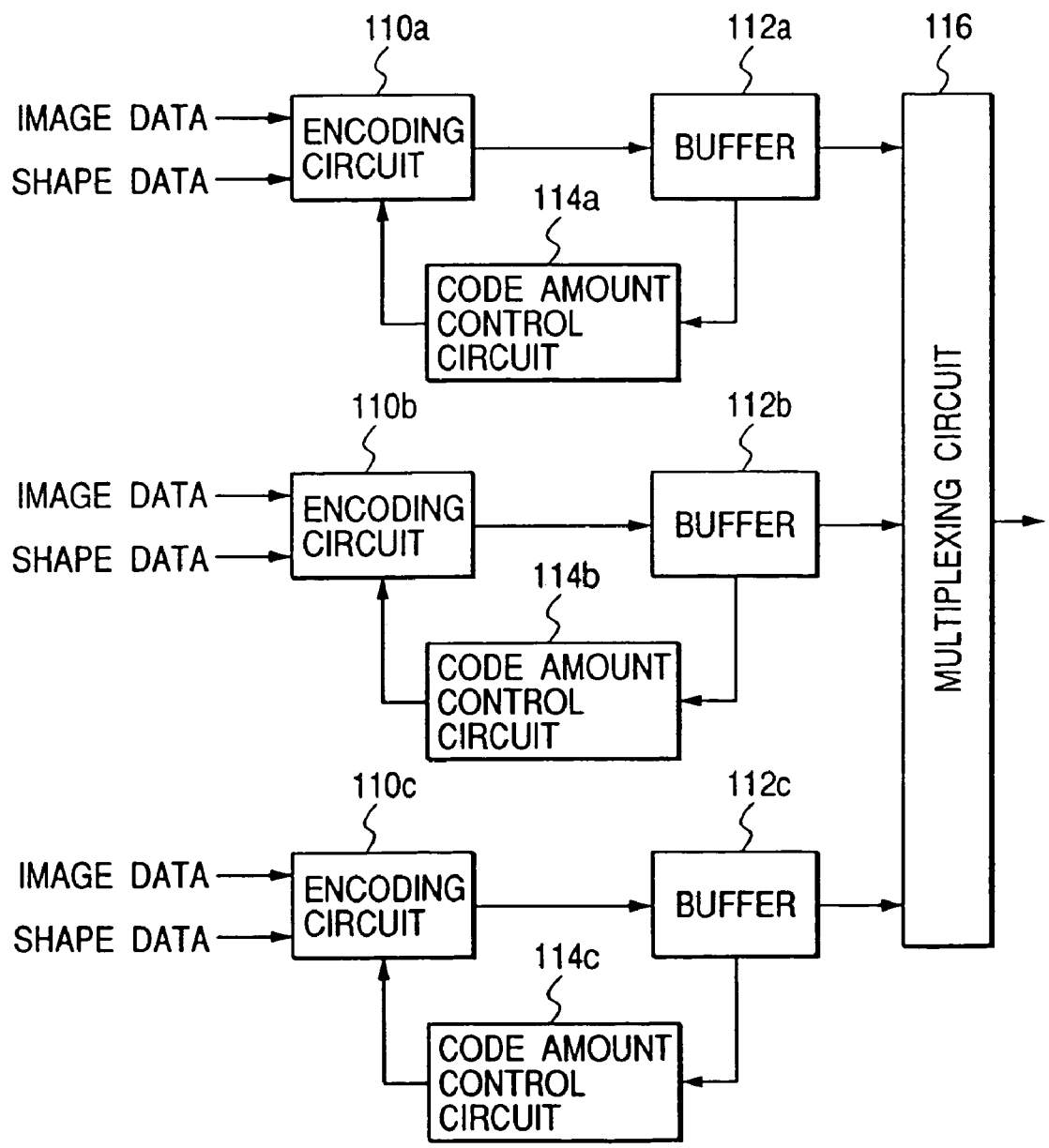
FIG. 3 is a block diagram showing a configuration of a conventional image encoding apparatus which performs encoding object by object.
Figure 4:
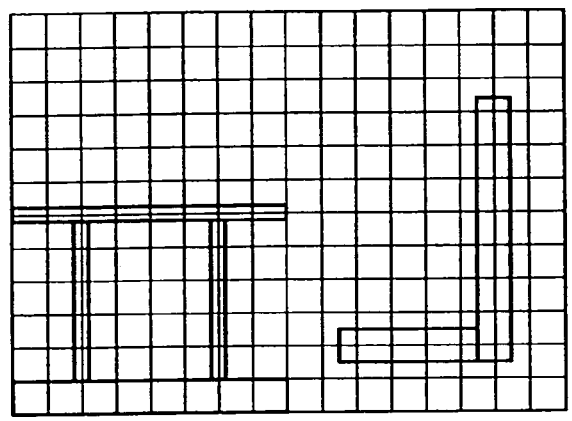
FIG. 4 is a schematic diagram showing a divided state of a background image into macroblocks.
Figure 5:
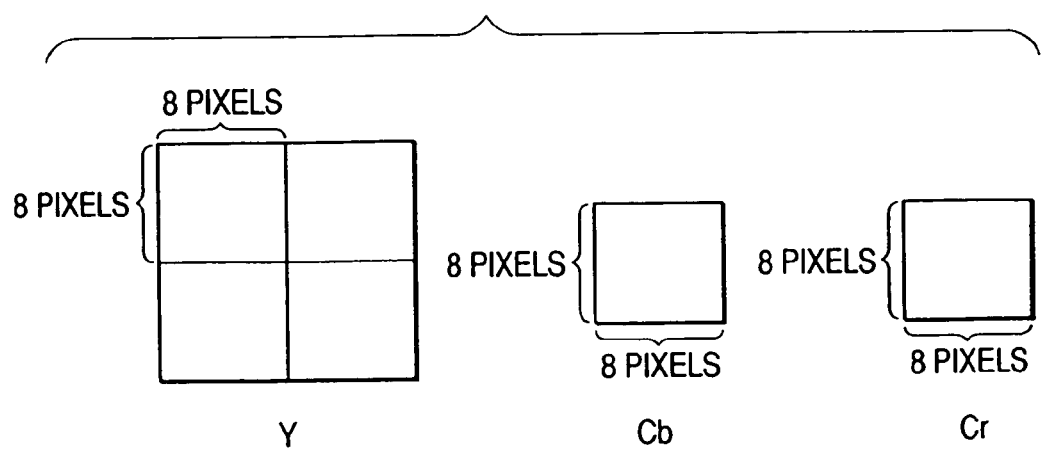
FIG. 5 illustrates the configuration of a macroblock.
Figure 6:
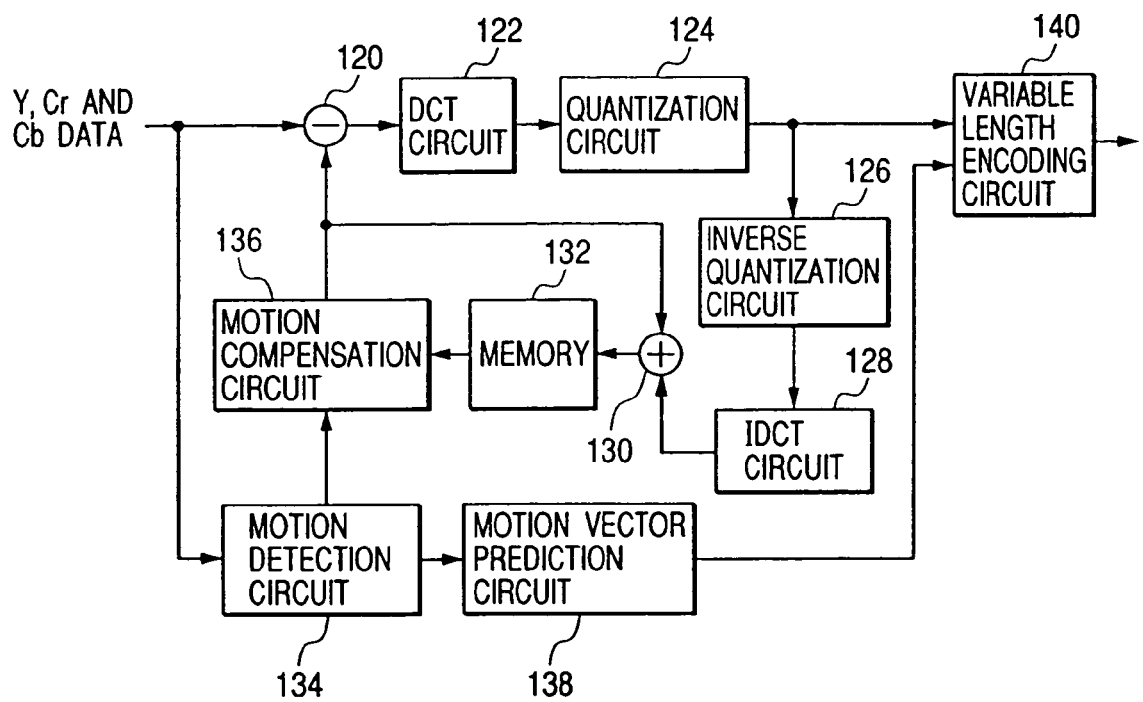
FIG. 6 is a block diagram showing a configuration of an encoding circuit for encoding a background image.
Figure 7A:
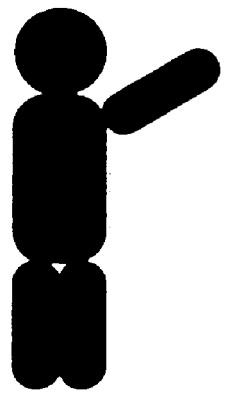
FIGS. 7A and 7B are schematic diagrams of shape data of a person and a rocket.
Figure 7B:
Figure 8A:
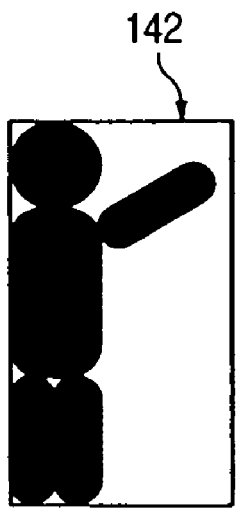
FIGS. 8A and 8B are schematic diagrams of bounding boxes of the person and rocket shape data.
Figure 8B:
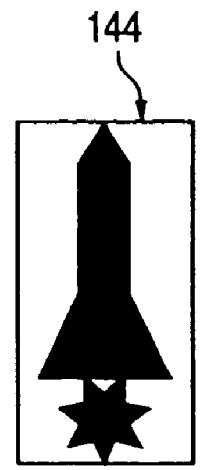

For example, if the image shown in FIG. 1 is divided into the objects shown in FIGS. 2A to 2C, followed by encoding, then in the example shown in FIG. 15, the numeral 18a represents a generated code amount of the background (FIG. 2A), numeral 18b represents a generated code amount of the person (FIG. 2B), and numeral 18c represents a generated code amount of the rocket (FIG. 2C). Thus, in this embodiment, the background is the lowest in the priority of code amount allocation among the objects.

At the first time, the generated code amount is greater than the target code amount. The background code amount is cut down and thereafter a total generated code amount is re-calculated. Since the result (repetition No. 2) of the calculation still exceeds the target code amount, so the background code amount is again reduced. This processing is repeated until the total generated code amount becomes smaller than the target code amount. In the example shown in FIG. 15, the total generated code amount becomes smaller than the target code amount at the fifth repetition.

Figure 16:
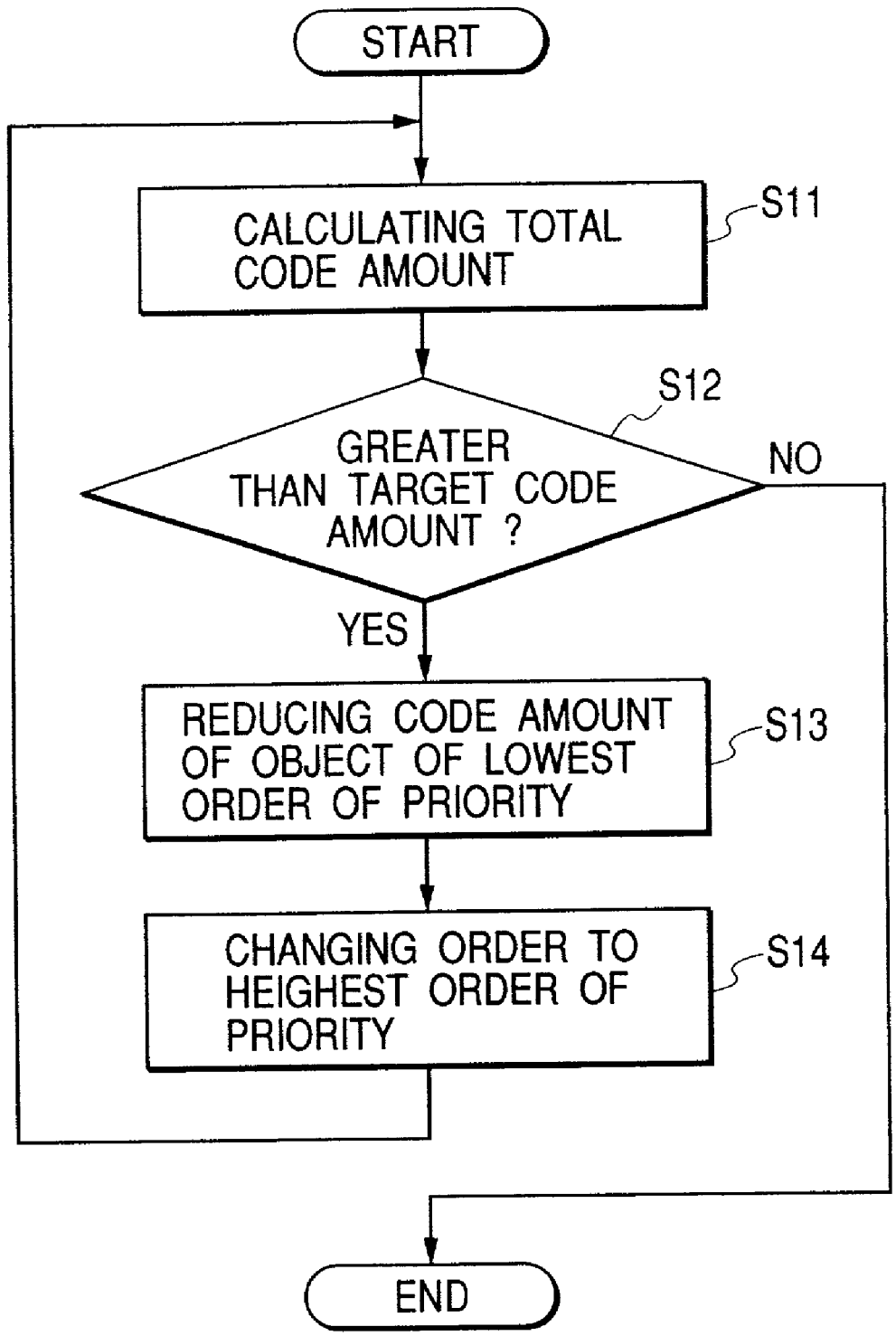
FIG. 16 is a flow chart showing a second example of processing operations of the code amount control circuit 14.
Figure 17:
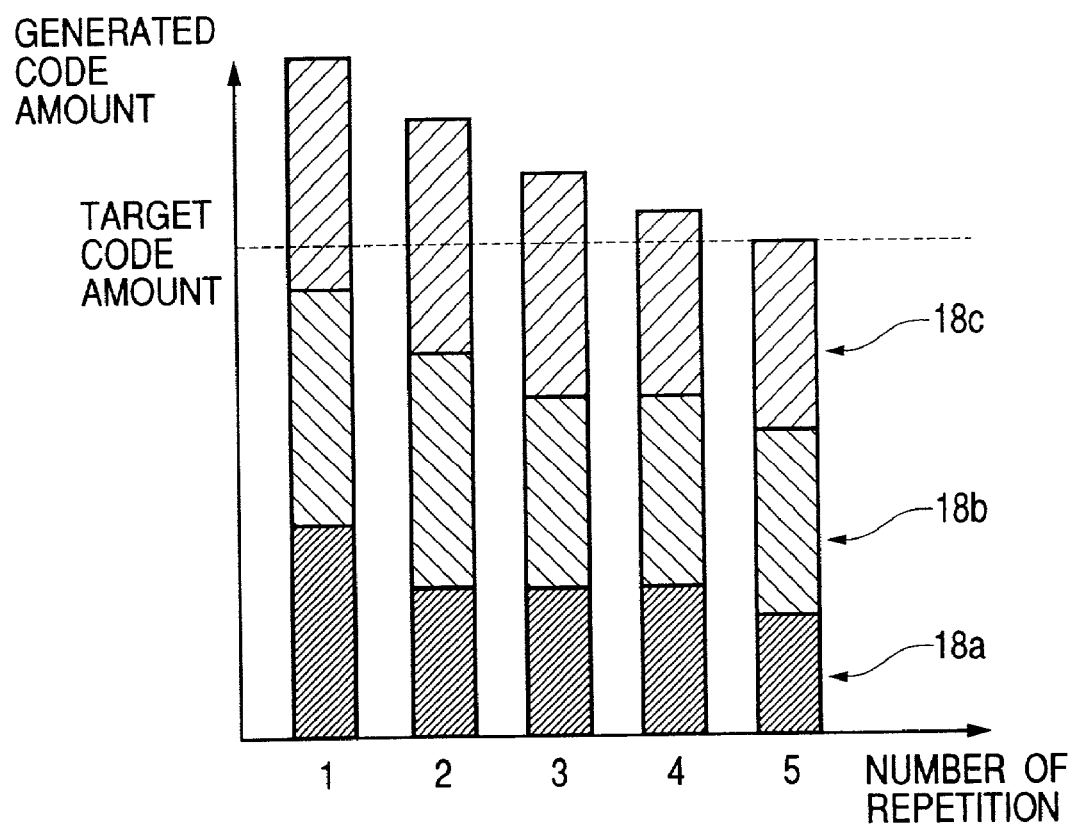
FIG. 17 is a schematic diagram showing in what manner a code amount control is made in accordance with the flow chart of FIG. 16.

Although in the flow chart shown in FIG. 14, the image quality of only the background image is deteriorated, background, person, and rocket may be ranked in this order and the respective generated code amounts may be controlled while taking balance among them. A flow chart of these operations is shown in FIG. 16 as a second example of a code amount control processing. FIG. 17 is a schematic diagram showing in what manner generated code amounts are converged to a target code amount by the code amount control processing shown in FIG. 16.

The code amount control circuit 14 calculates a total code amount by integrating stored data amounts in the buffers 12a, 12b, and 12c (S11), then determines whether the calculated total code amount is greater than the target code amount or not (S12), then if the total code amount is greater than the target code amount (S12), the control circuit 14 controls the encoding circuit 10a, 10b, or 10c so as to reduce the code amount of the object of the lowest priority (S13). Then, the priority order of the lowest priority object is changed to the highest order and the orders of the other objects are lowered accordingly (S14). Subsequently, a total code amount is again calculated (S11), followed by repetition of reducing the code amount of the lowest priority object (S13), changing the priority order (S14) and re-calculation (S11) until the total code amount calculated becomes smaller than the target code amount (S12).

For example, if the image shown in FIG. 1 is divided into the objects shown in FIGS. 2A to 2C, followed by encoding, then in the example shown in FIG. 17 (the same contents as in FIG. 15 being identified by the same reference numerals as in FIG. 15), the priority becomes lower at the beginning in the order of rocket (FIG. 2C), person (FIG. 2B) and background (FIG. 2A), and since the total generated code amount in the first calculation exceeds a target code amount, the code amount 18a of the background of the lowest priority is reduced. Also in the resulting second calculation the total generated code amount exceeds the target code amount and this time the code amount 18b of the person is reduced. Subsequently, in response to a result of the third calculation the code amount 18c of the rocket is reduced and in response to a result of the fourth calculation the code amount 18a of the background is again reduced.

In this way, circulating the objects to be reduced in code amount it is possible to prevent deterioration of only one object and effect a substantially uniform deterioration in quality of the objects.

Figure 18:
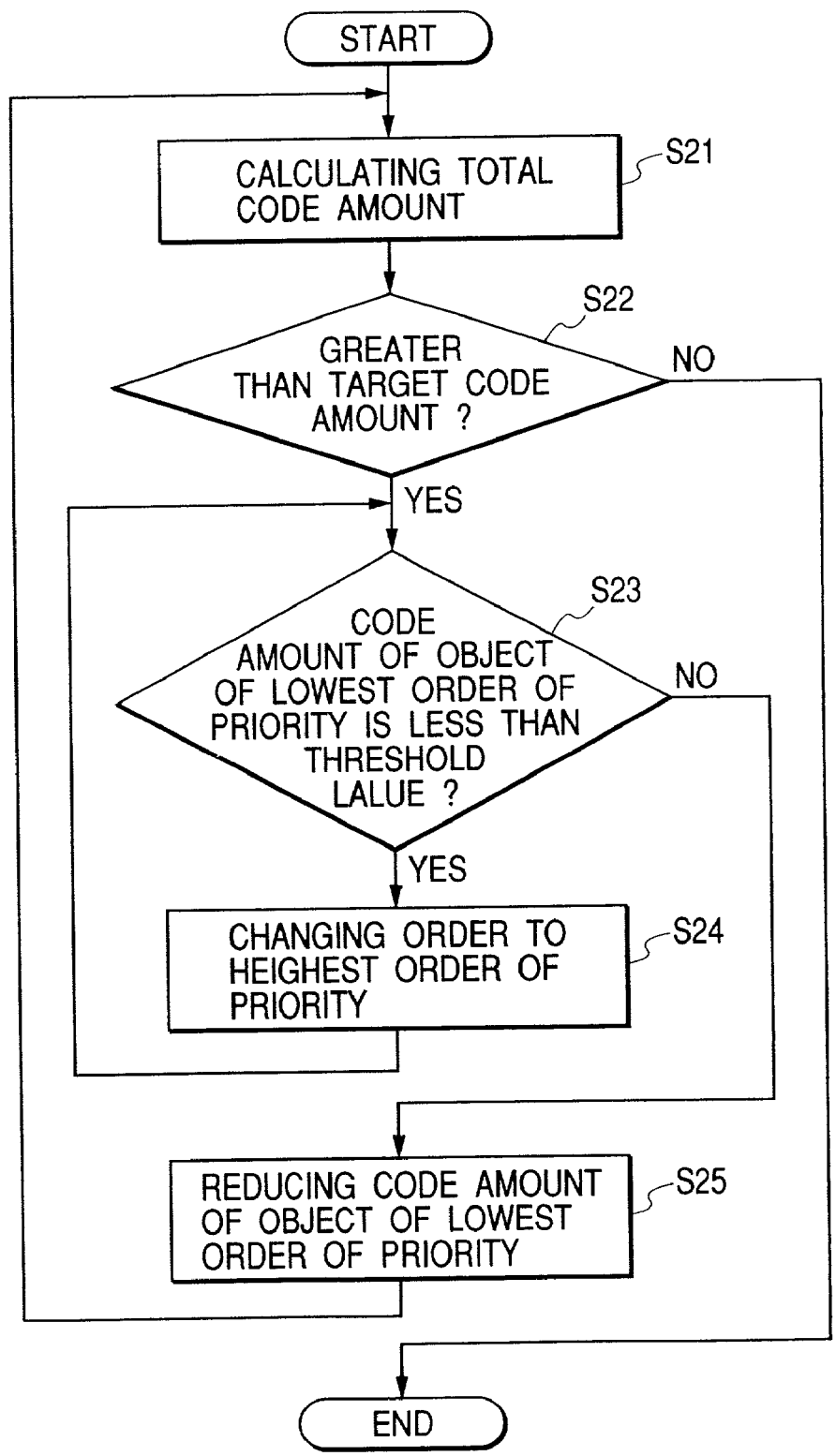
FIG. 18 is a flow chart showing a third example of processing operations of the code amount control circuit 14.

There may be adopted a method wherein the code amount of the lowest priority object is mainly reduced, but when it has become smaller than a predetermined threshold value, the code amount of the next order object is reduced. FIG. 18 is a flow chart showing operations of a code amount control circuit 14 which so operates, as a third example of a code amount control processing and FIG. 19 is a schematic diagram showing in what manner the generated code amount is converged to the target code amount by the code amount control processing shown in FIG. 18.

The code amount control circuit 14 calculates stored data amounts in the buffers 12a, 12b, and 12c and calculates a total code amount (S21), then determines whether the total code amount is greater than the target code amount or not (S22), then if the total code amount is greater than the target code amount (S22), the control circuit 14 checks to see if the code amount of the lowest priority is below the predetermined threshold value or not (S23).

In the case where the code amount of the lowest priority object is equal to the predetermined threshold value (S23), the encoding circuit 10a, 10b, or 10c is controlled so as to reduce the code amount of the lowest priority object (S24). Again, a total code amount is calculated (S21) and the above operations are repeated until the total code amount becomes smaller than the target code amount (S22). During this period, if the code amount of the lowest priority object becomes smaller than the predetermined threshold value (S23), the priority order of the lowest priority object is changed to the highest order and the priorities of the other objects are lowered accordingly (S25). Thereafter, the code amount of the lowest priority object is reduced (S24).

Figure 19:
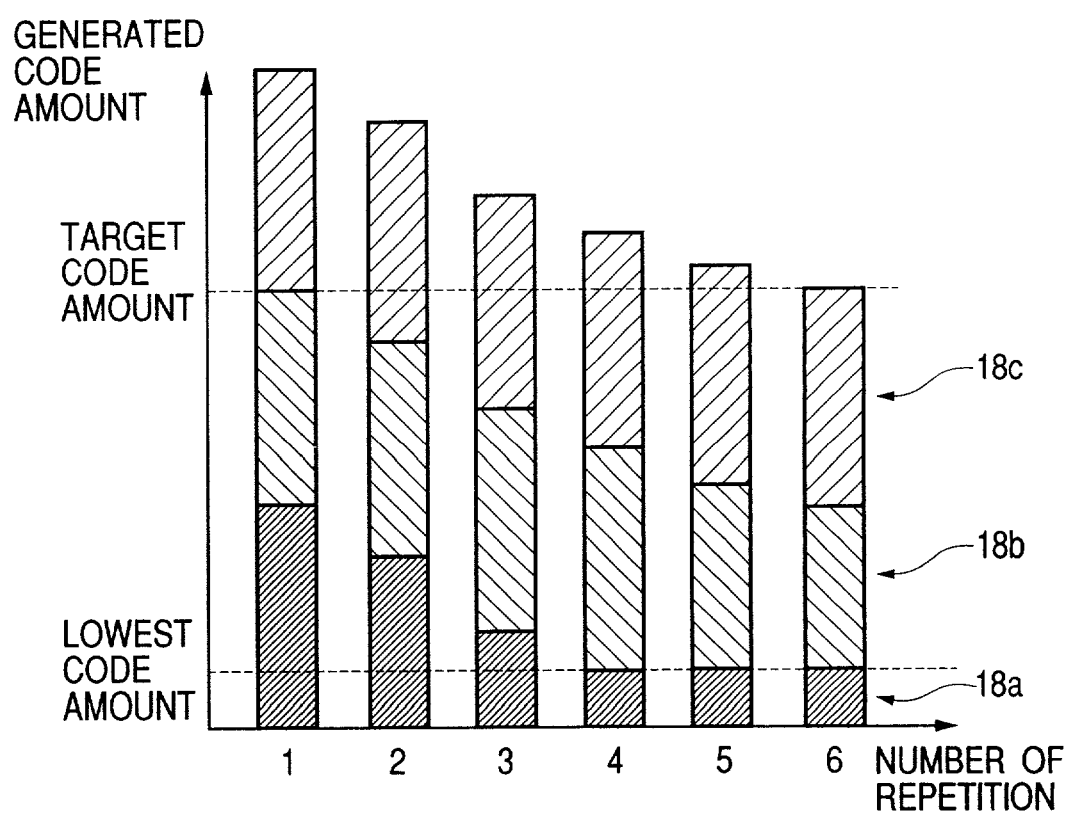
FIG. 19 is a schematic diagram showing in what manner a code amount control is made in accordance with the flow chart of FIG. 18.

For example, if the object shown in FIG. 1 is divided into the objects shown in FIGS. 2A to 2C, followed by encoding, then in the example shown in FIG. 19 (the same contents as in FIG. 15 being identified by the same reference numerals as in FIG. 15), the code amount 18a of the background is reduced continuously until the fourth calculation, but upon reaching a threshold code amount the priority of the person becomes the lowest and the code amount of the person is reduced. As a result, in the sixth calculation, the total code amount becomes smaller than the target code amount.

By such a control it is possible to ensure the lowest code amount; besides, since the image quality is deteriorated successively from the lowest priority object, even if the total code amount is made smaller than the target code amount, the quality of a desired object can be maintained as high as possible.

Figure 20:
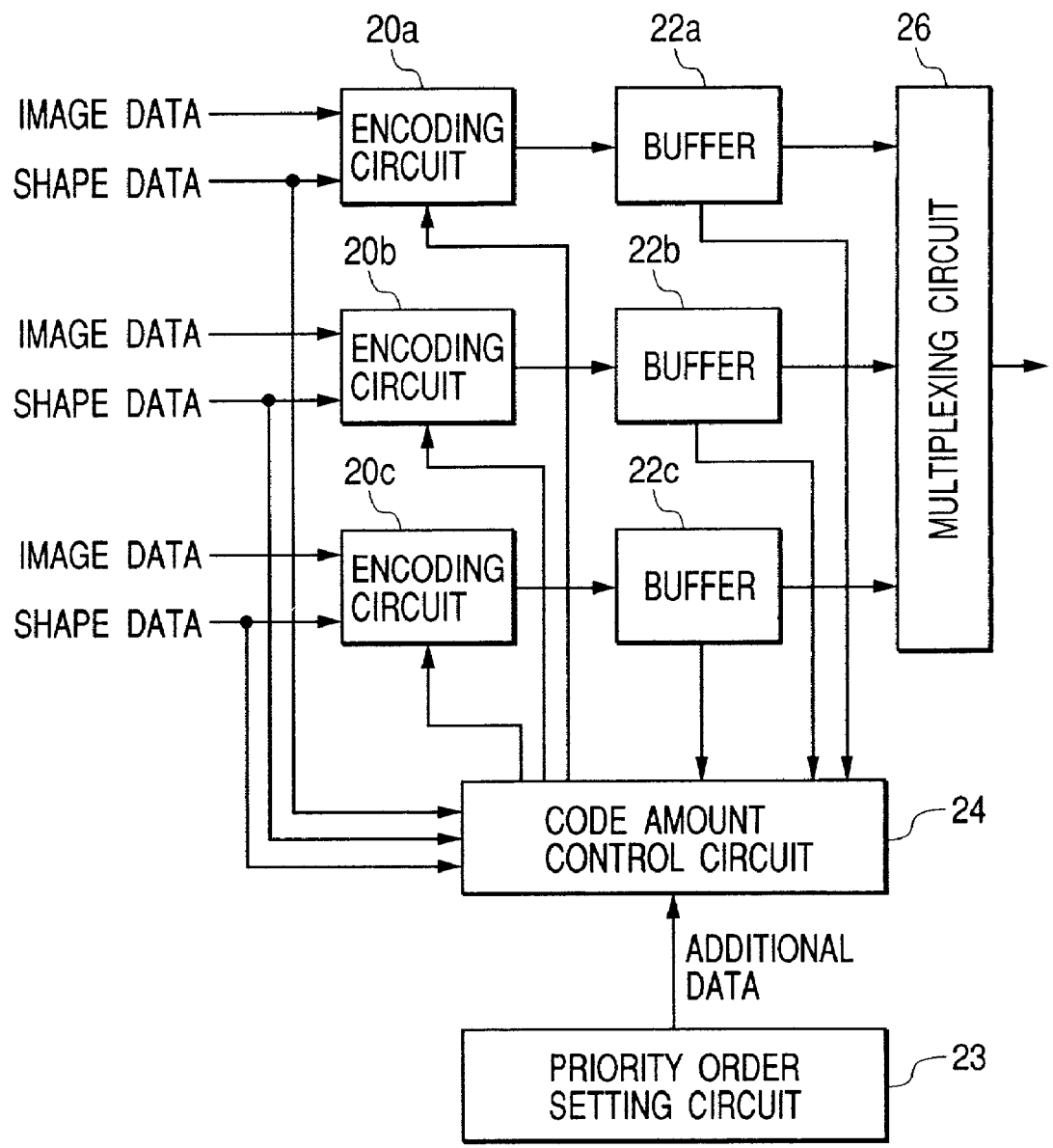
FIG. 20 is a block diagram showing a configuration of an image encoding apparatus according to a second embodiment of the present invention.

FIG. 20 is a block diagram showing a configuration of an image encoding apparatus according to the second embodiment of the present invention.

In the same figure, the reference numerals 20a, 20b, and 20c denote encoding circuits for encoding image data and shape data of objects, the numerals 22a, 22b, and 22c denote buffers for temporarily storing output data of the encoding circuits 20a, 20b, and 20c, numeral 23 denotes a priority order setting circuit for setting priorities among the objects, numeral 24 denotes a code amount control circuit which controls a compression ratio (more specifically, a quantization step size) by the encoding circuits 20a, 20b, and 20c so that the total generated code amount becomes an optimum value in accordance with additional data, shape data of objects, and residual capacities or stored data amounts of the buffers 22a, 22b, and 22c, and numeral 26 denotes a multiplexing circuit for multiplexing the outputs of the buffers 22a, 22b, and 22c.

In FIG. 20, a difference from the embodiment shown in FIG. 13 resides in that the code amount control circuit 24 utilizes shape data of objects in addition to additional data. The functions of the encoding circuits 20a to 20c and buffers 22a to 22c are the same as the functions of the encoding circuits 10a to 10c and buffers 12a to 12c, respectively.

Figure 21:
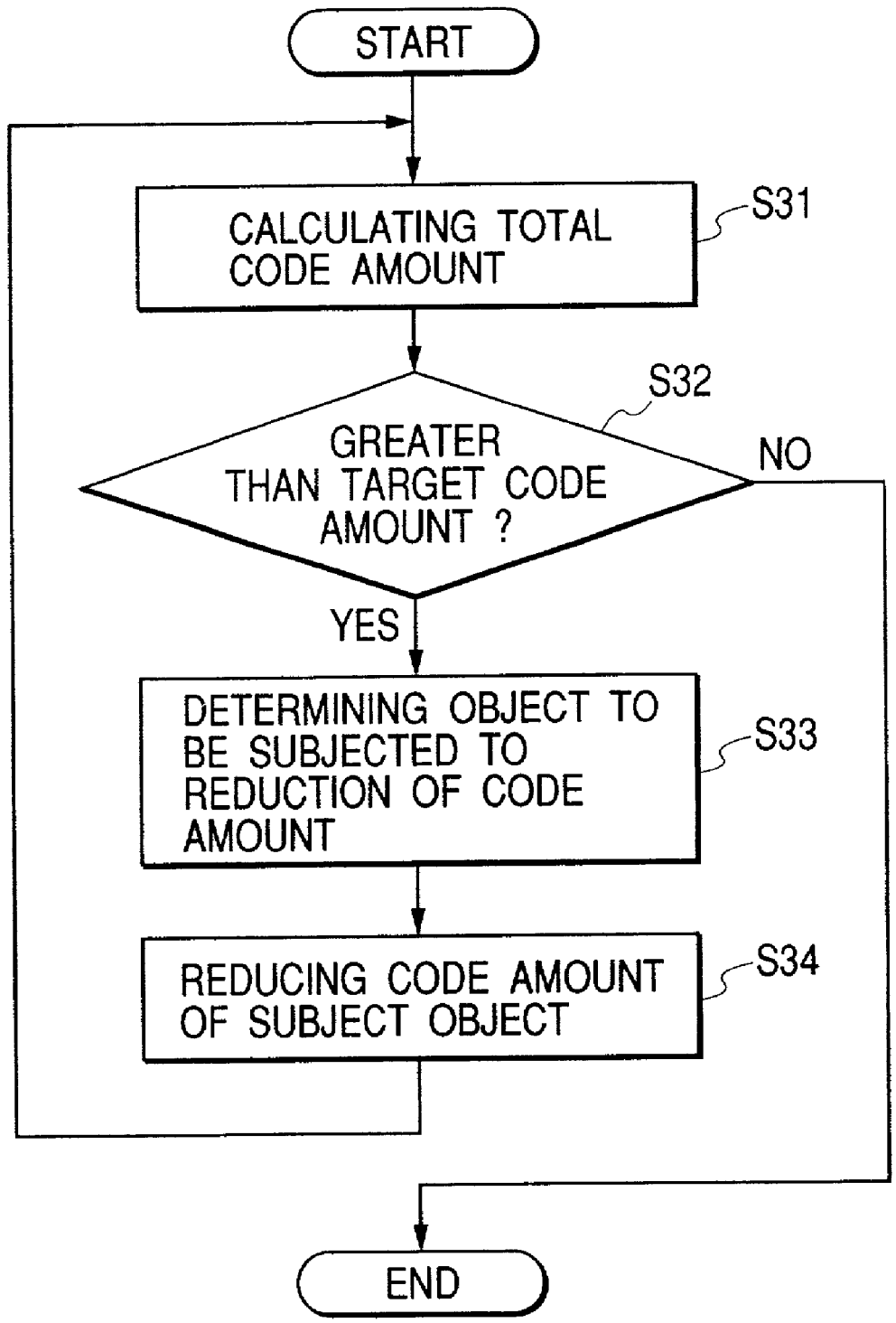
FIG. 21 is a flow chart showing a first example of processing operations of a code amount control circuit 24.

FIG. 21 is a flow chart showing an example of operations of the code amount control circuit 24.

In the same figure, the code amount control circuit 24 calculates a total code amount by integrating stored data amounts in the buffers 22a, 22b, and 22c (S31), then determines whether the thus-calculated total code amount is greater than a target code amount or not (S32), and if the total code amount is greater than the target code amount (S32), the control circuit 24 determines an object to be reduced in code amount (S33). How to determine such an object will be described in detail later.

Then, the code amount control circuit 24 controls the encoding circuit 20a, 20b, or 20c so as to reduce the code amount of the object thus determined (S34), then calculates a total code amount again (S31) and repeats these operations until the total code amount becomes smaller than the target code amount (S32).

Figure 22:
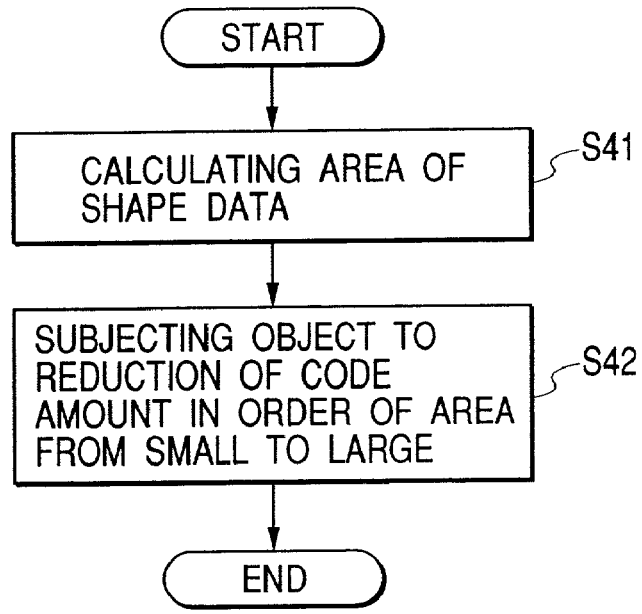
FIG. 22 is a flow chart showing a first example of processing operations of step S33 in FIG. 21.

FIG. 22 is a flow chart showing a first operation example of S33 in FIG. 21.

In the same figure, an area of each object is calculated on the basis of shape data of the object (S41) and the object of the smallest area is determined to be an object to be reduced in code amount (S42). Since shape data is a binary data indicating the interior and exterior of an object concerned, the area of the object can be calculated by counting the number of pixels present within the object. The objects are set their priorities in order from large to small area. The size of each object varies from plane to plane, so for accurate determination of a priority order it is desirable to calculate the area for each plane. Area calculation interval and timing are set according to the accuracy required. For a background image not having any shape data, a priority may be set (e.g., to the lowest order) beforehand by the priority order setting circuit 23. Further, a lowest code amount of the background image is determined in advance and control is made so that the code amount of the background image does not become smaller than the lowest code amount.

Figure 23:
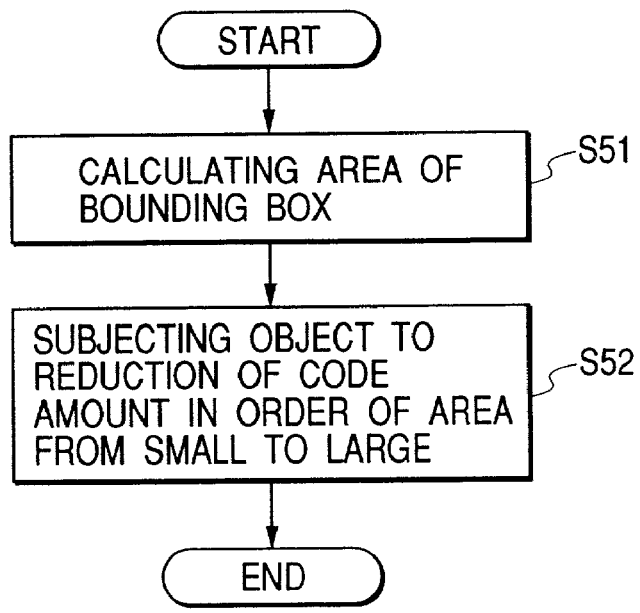
FIG. 23 is a flow chart showing a second example of processing operations of step S33 in FIG. 21.

FIG. 23 is a flow chart showing a second operation example of S33 in FIG. 21.

In the same figure, an area of a bounding box is calculated (S51) and an object of the smallest area is determined to be an object whose code amount is to be reduced (S52). The calculation is easy because horizontal and vertical sizes of each bounding box are already known before encoding. Even if the number of macroblocks, not the actual number of pixels, is counted, there will be obtained the same result. The objects are set their priorities in order from large to small area. Since the bounding box size of each object varies from plane to plane, area calculation interval and timing are set according to the accuracy required. The background image may be handled in the same way as in FIG. 22.

Figure 24:
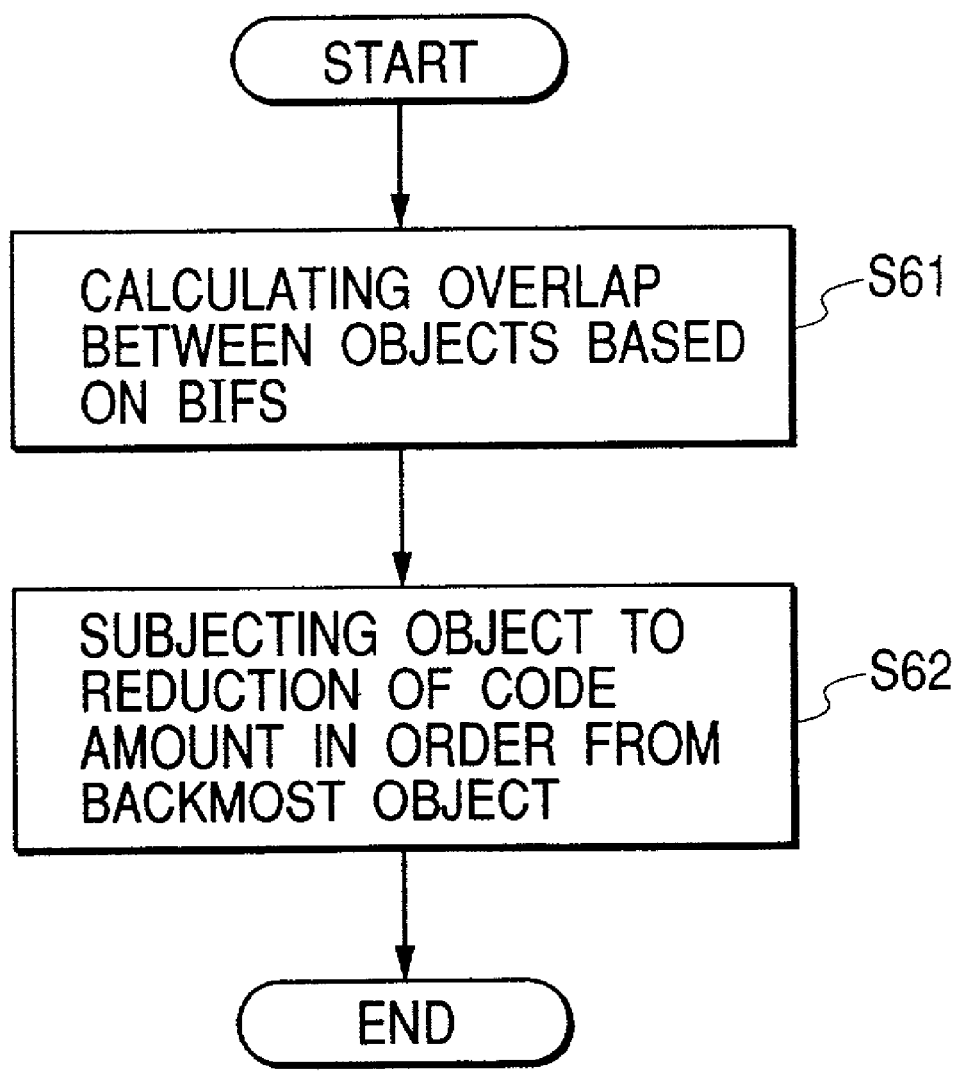
FIG. 24 is a flow chart showing a third example of processing operations of step S33 in FIG. 21.

FIG. 24 is a flow chart showing a third operation example of S33 in FIG. 21.

In the same figure, an overlap degree of objects is calculated in accordance with BIFS (Binary Format for Scene) which defines positions of objects and overlap thereof (S61) and the backmost object is determined to be an object whose code amount is to be reduced (S62). In the BIFS there are described only up-and-down relation of overlap and coordinates of bounding boxes, so it is necessary to here calculate how objects overlap one another at the actual pixel level. A simple method is merely calculating a degree of overlap of bounding boxes, or there may be adopted a method wherein only the setting of an up-and-down relation is utilized and an actual degree of overlap is not calculated. Overlapped objects are set their priorities in order from large to small in their areas which are seen. Since the degree of overlap varies from plane to plane, overlap calculation interval and timing are set according to the accuracy required. Even in case of using only an up-and-down relation of each object plane, a front object may shift to the back and therefore the priority order is updated suitably. Also in this case the background image may be handled in the same way as in FIG. 22.

Figure 12:
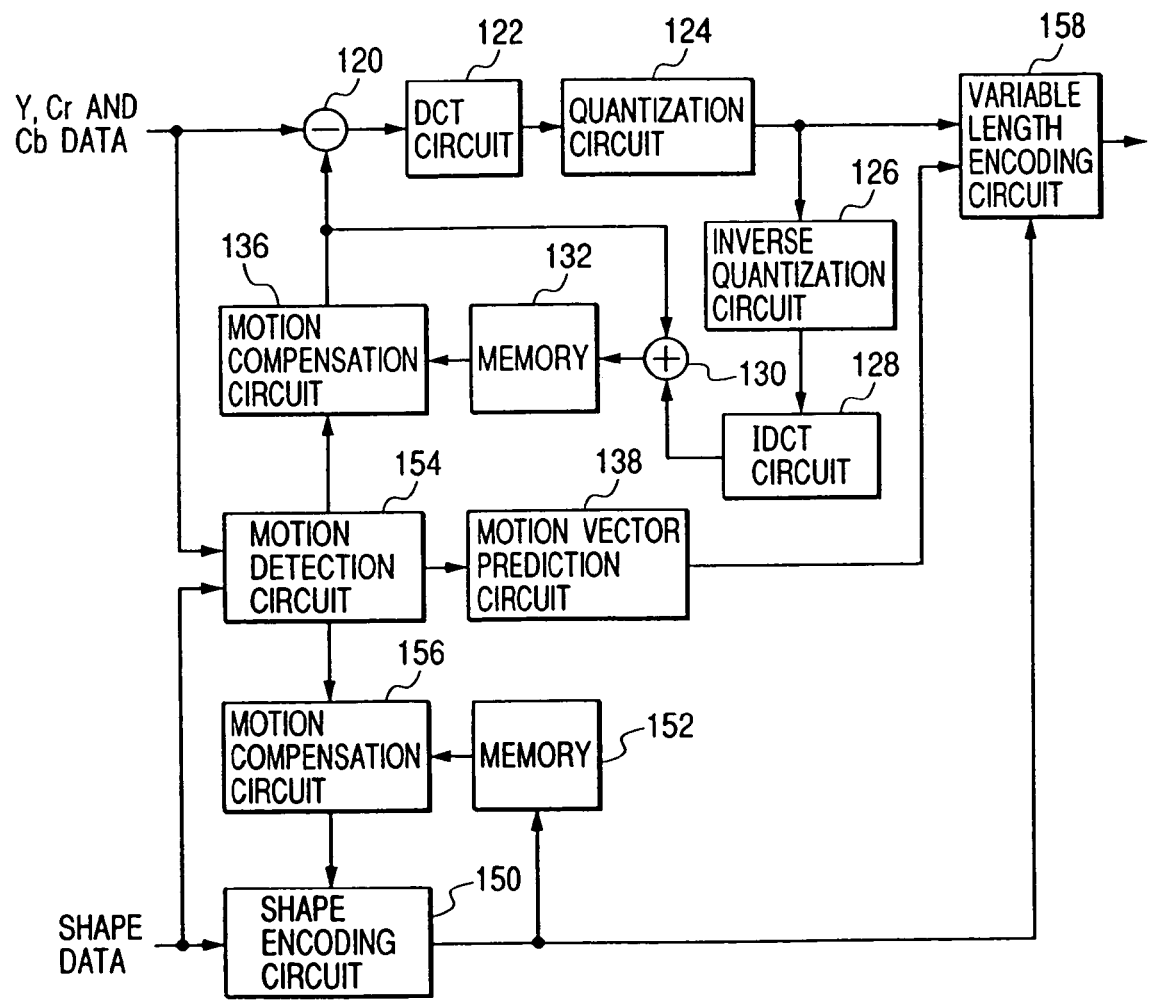
FIG. 12 is a schematic diagram showing a configuration of encoding circuits 110a to 110c.
Figure 25:
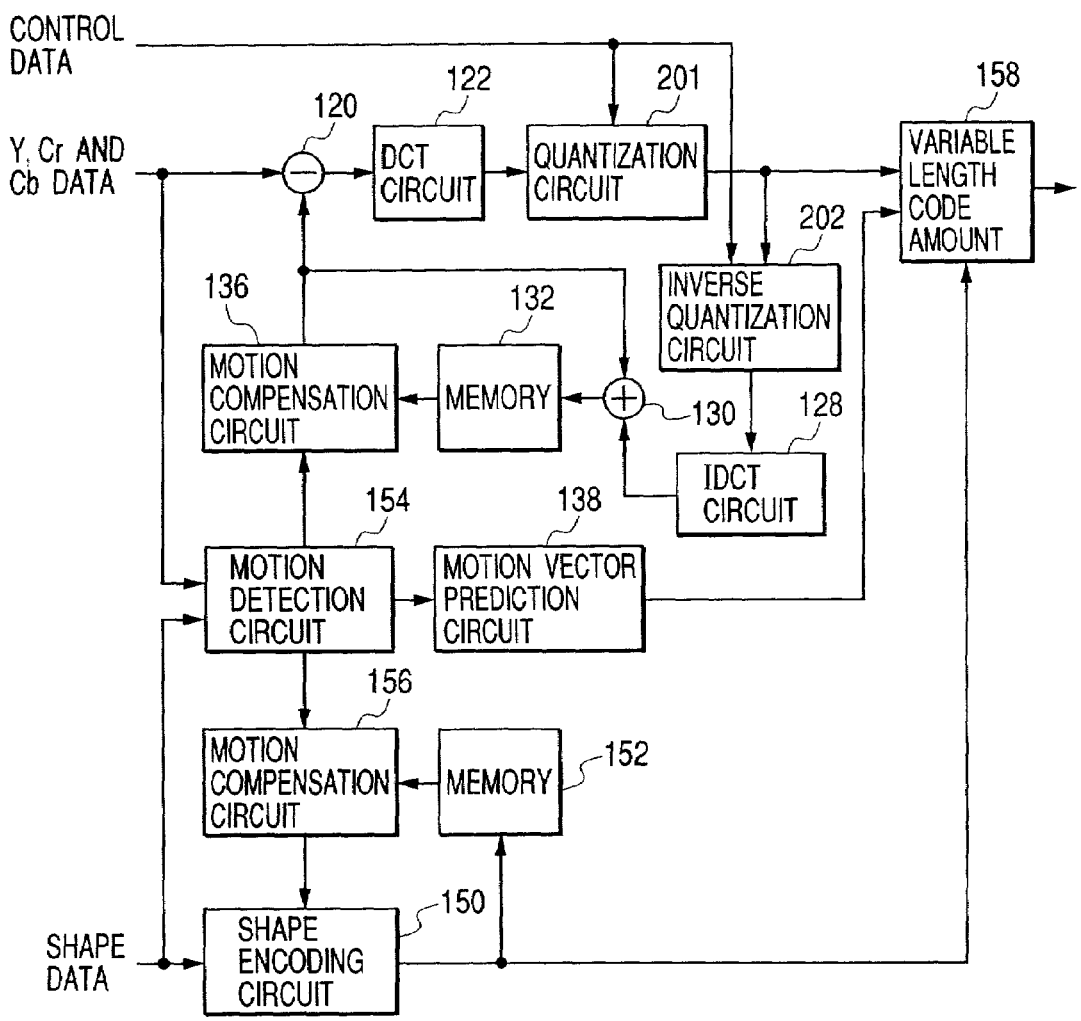
FIG. 25 is a block diagram showing a configuration of encoding circuits 10a to 10c and 20a to 20c in the present invention.

The encoding circuits 10a to 10c and 20a to 20c used in the above first and second embodiments are configured as in FIG. 25, in which the same components as in FIG. 12 are identified by the same reference numerals as in FIG. 12 and explanations thereof will be omitted.

In FIG. 25, quantization parameters of quantization circuits 201 and 202 are controlled in accordance with control data provided from the code amount control circuit 14 or 24.

It is optional whether the present invention is to be applied to a system comprising plural devices (e.g., a host computer and an interfacing device) or to an apparatus comprising a single device (e.g., a video camera or a VTR).

Figure 26:
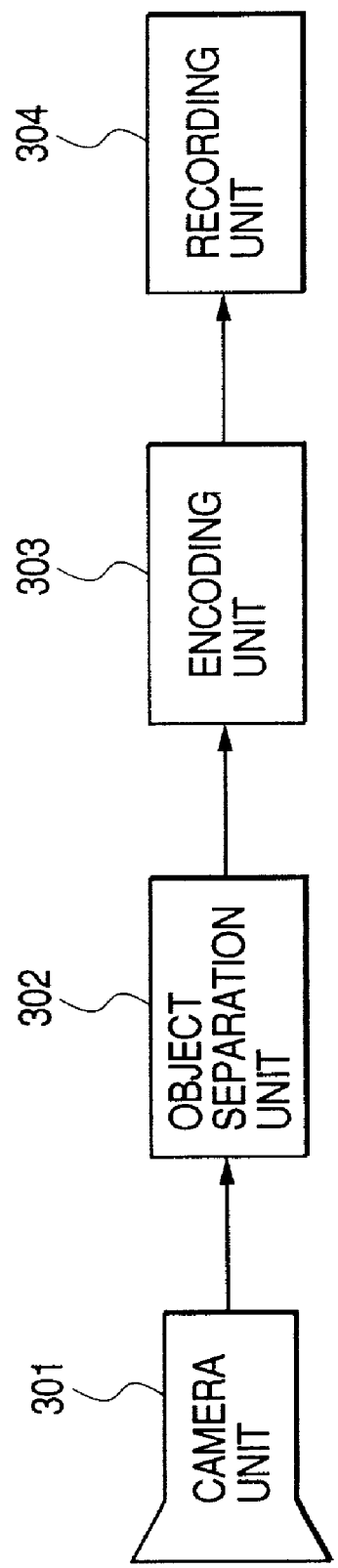
FIG. 26 is a block diagram showing a configuration of a video camera in the present invention.

FIG. 26 illustrates a video camera to which the image encoding apparatus described in the above first or second embodiment is applied.

In the same figure, image data obtained by photographing an object image is outputted from a camera unit 301 and is fed to an object separation unit 302, in which plural objects are extracted from a single screen of the image data and both image data and shape data of the thus-extracted objects are generated. In an encoding unit 303 is incorporated the image encoding system described in the above first or second embodiment. Image data encoded by the encoding unit 303 are recorded in a recording medium (e.g., magnetic tape, hard disk, optical disk, or memory) by a recording unit 304.

In the scope of the present invention there also is included a configuration wherein, for allowing various devices to operate so as to implement the functions of the above embodiments, a software program code for implementing the said functions is fed to a computer (CPU or MPU) disposed within an apparatus or system connected to various devices, and the computer is allowed to operate in accordance with the stored program to operate the various devices.

In this case, the software program code itself comes to implement the functions of the above embodiments and the program code itself or means for feeding the program code to the computer, e.g., a recording medium which stores the program code, constitute the present invention. As the recording medium which stores the program code there may be used, for example, a floppy disk, hard disk, optical disk, magneto-optic disk, CD-ROM, magnetic tape, non-volatile memory card, or ROM.

Also in the case where not only the functions of the above embodiments are implemented by execution of a fed program code with a computer, but also the said functions are implemented by cooperation of the program code with an OS (operating system) operating in the computer or with another application software, such a program code is included as an embodiment in the present invention, as a matter of course.

Further, also in the case where, after a fed program code has been stored in memory provided in a function expansion board of a computer or in a function expansion unit connected to a computer, a CPU for example provided in the function expansion board or unit executes part or the whole of an actual processing in accordance with directions given in the program code, and the functions described in the foregoing embodiments are realized by the said processing, such a mode is included in the present invention as a matter of course.

According to the above embodiments, as will be seen from the above description, the code amount of each object is controlled while taking a target code amount of the entire system into account and therefore it is possible to realize an optimum code amount control as a whole. For example, by allowing the image quality of only a specific object to be deteriorated it is possible to control the total code amount while maintaining the other objects in a high image quality condition. Besides, by setting a priority order for code amount reduction among objects and changing the priority order as necessary, it is possible to control the total code amount so as to give a well-balanced image quality as a whole. Further, it is possible to control the total code amount while allowing the image quality of a specific object to be deteriorated but ensuring a minimum required image quality thereof and so as to give a good image quality of the other objects.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:

a) inputting means for inputting image data of plural objects;

b) encoding means for encoding, with an encoding parameter, the image data inputted by said inputting means, on an object basis;
c) setting means for setting a priority order of code amount allocation for each of the objects; and
d) control means for controlling the encoding parameter of the object having a lowest priority order among the objects having the priority order set by said setting means, when a total code amount obtained by encoding the image data of the plural objects exceeds a predetermined code amount.

2. An apparatus according to claim 1, wherein said control means changes the priority order at a predetermined timing.

3. An apparatus according to claim 2, wherein the predetermined timing is determined according to how many times a code amount reduction processing for the objects is executed or according to code amounts of the objects.

4. An apparatus according to claim 1, wherein, when the code amount of an object set to a lowest priority becomes smaller than a predetermined lower limit value, said setting means sets another object to the lowest priority.

5. An apparatus according to claim 1, wherein said encoding means breaks down the image data of the objects at least into pixel data and shape data and encodes the pixel data and the shape data, and said setting means determines the priority order in accordance with a size of shape data of the objects.

6. An apparatus according to claim 1, wherein said encoding means executes the encoding operation in accordance with MPEG-4, and said setting means determines the priority order in accordance with sizes of bounding boxes of the objects.

7. An apparatus according to claim 1, wherein said encoding means includes quantization means for quantizing the image data of the objects, and the encoding parameter indicates a quantizing parameter of said quantization means.

8. An apparatus according to claim 1, further comprising recording means for recording the data encoded by said encoding means into a recording medium.

9. An image processing apparatus according to claim 1, wherein said inputting means comprises image pickup means for photographing an object image and generating image data.

10. A video camera provided with the image processing apparatus according to claim 1.

11. An image processing method comprising the steps of:
a) inputting image data of plural objects;
b) encoding, with an encoding parameter, the image data inputted in said inputting step, on an object basis;
c) setting a priority order of code amount allocation for each of the objects; and
d) controlling the encoding parameter of the object having a lowest priority order among the objects having the priority order set in said setting step, when a total code amount obtained by encoding the image data of the plural objects exceeds a predetermined code amount.

12. A computer readable medium for storing program codes of encoding steps, said encoding steps comprising:
a) an inputting step, of inputting image data of plural objects;
b) an encoding step, of encoding, with an encoding parameter, the inputted image data on an object basis;
c) a setting step, of setting a priority order of code amount allocation for each of the objects; and
d) a controlling step, of controlling the encoding parameter of the object having a lowest priority order among the objects having the priority order set in said setting step, when a total code amount obtained by encoding the image data of the plural objects exceeds a predetermined code amount.

13. An image processor comprising:
a) an inputting unit, arranged to input image data of plural objects;
b) an encoder, arranged to encode, with an encoding parameter, the image data inputted by said inputting unit, on an object basis;
c) a setting unit, arranged to set a priority order of code amount allocation for each of the objects; and
d) a control unit, arranged to control the encoding parameter of the object having a lowest priority order among the objects having the priority order set by said setting unit, when a total code amount obtained by encoding the image data of the plural objects exceeds a predetermined code amount.

* * * * *